(12) United States Patent
Yamamoto et al.

(10) Patent No.: US 11,568,359 B2
(45) Date of Patent: Jan. 31, 2023

(54) MANAGEMENT DEVICE, MANAGEMENT METHOD, AND PROGRAM

(71) Applicant: HONDA MOTOR CO., LTD., Tokyo (JP)

(72) Inventors: Kensaku Yamamoto, Wako (JP); Yusuke Kawada, Wako (JP); Koichi Ogura, Tokyo (JP); Masahiro Motoyoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 17/202,399

(22) Filed: Mar. 16, 2021

(65) Prior Publication Data

US 2021/0295246 A1    Sep. 23, 2021

(30) Foreign Application Priority Data

Mar. 18, 2020   (JP) .............................. JP2020-047105

(51) Int. Cl.
*G06Q 10/08* (2012.01)
*B60W 60/00* (2020.01)

(52) U.S. Cl.
CPC ......... *G06Q 10/087* (2013.01); *B60W 60/001* (2020.02); *G06Q 10/0833* (2013.01); *G06Q 10/0836* (2013.01); *G06Q 10/0837* (2013.01)

(58) Field of Classification Search
CPC ............. G06Q 10/087; G06Q 10/0833; G06Q 10/0836; G06Q 10/0837; G06Q 10/083; G06Q 10/02; G06Q 10/0631; G06Q 10/06314; B60W 60/001; B60W 60/00256

USPC .......................................................... 705/28
See application file for complete search history.

(56) References Cited

U.S. PATENT DOCUMENTS

| | | | |
|---|---|---|---|
| 2017/0323257 A1* | 11/2017 | Cheatham, III | B64C 39/024 |
| 2018/0224867 A1* | 8/2018 | Yu | G06Q 10/08 |
| 2019/0073631 A1* | 3/2019 | Ferguson | B60H 1/00735 |
| 2021/0118079 A1* | 4/2021 | Li | H04W 4/029 |
| 2022/0036284 A1* | 2/2022 | Oyama | G06Q 10/063114 |

FOREIGN PATENT DOCUMENTS

| | | | |
|---|---|---|---|
| JP | 2018-058656 | | 4/2018 |
| JP | 2018058656 | * | 4/2018 |

* cited by examiner

*Primary Examiner* — Garcia Ade
(74) *Attorney, Agent, or Firm* — Amin, Turocy & Watson, LLP

(57) ABSTRACT

Provided is a management device for managing an operation of a package delivery vehicle configured to travel autonomously on a road without accommodating a driver, and capable of storing a package into each of a plurality of storages each covered by an openable and closable door, the management device including: a storage device that stores a program; and a hardware processor, in which the hardware processor is configured to execute the program stored in the storage device to: receive application information on delivery of the package from a user; and determine an operation of the package delivery vehicle, in which the hardware processor is configured to cause the package delivery vehicle during delivery of a package to collect a new package.

10 Claims, 9 Drawing Sheets

392

| USER ID | COMMUNICATION IDENTIFICATION INFORMATION | NAME | SEX | AGE | ADDRESS | OCCUPATION |
|---|---|---|---|---|---|---|
| 0001 | *** | AA | MALE | 9 | ○○ | ○○ |
| 0004 | *** | BB | FEMALE | 35 | ○○ | ○○ |
| ... | ... | ... | ... | ... | ... | ... |

394

| USER ID | PACKAGE ID | LOADING LOCATION | UNLOADING LOCATION | PREFERRED LOADING TIME | PACKAGE TYPE | STORAGE SPACE SPECIFICATION INFORMATION | ... |
|---|---|---|---|---|---|---|---|
| 0001 | A025 | (, ) | (, ) | 2020/04/30/ 10:20 | TYPE A | 1-3 | ... |
| 0002 | A134 | (, ) | (, ) | 2020/05/02/ 15:00 | TYPE A | 2-2 | ... |
| 0005 | A002 | (, ) | (, ) | 2020/05/02/ 14:30 | TYPE B | 2-1 | ... |
| ... | ... | ... | ... | ... | ... | ... | ... |

| STORAGE SPACE SPECIFICATION INFORMATION | EVENT (1) | EVENT (2) | EVENT (3) | EVENT (4) | EVENT (5) |
|---|---|---|---|---|---|
| 1-1 | ●●●:●● LOADING PACKAGE ID:A012 | ●●●:●● UNLOADING PACKAGE ID:A012 | — | — | ●●●:●● LOADING PACKAGE ID:A658 |
| ⋮ | ⋮ | ⋮ | ⋮ | ⋮ | ⋮ |
| 1-9 | ●●●:●● LOADING PACKAGE ID:A264 | — | — | ●●●:●● UNLOADING PACKAGE ID:A264 | — |
| 2-1 | VACANT | — | ●●●:●● LOADING PACKAGE ID:A333 | — | — |
| ⋮ | ⋮ | ⋮ | ⋮ | ⋮ | ⋮ |
| 2-9 | ●●●:●● LOADING PACKAGE ID:A654 | — | — | — | — |
| LOCATION | (,) | (,) | (,) | (,) | (,) |
| PATH | — | LINK 12, LINK 24, ~ | ~ | ~ | ~ | ered to refer to use history information of the user, and set
MANAGEMENT DEVICE, MANAGEMENT METHOD, AND PROGRAM

CROSS-REFERENCE TO RELATED APPLICATION

Priority is claimed on Japanese Patent Application No. 2020-047105 filed on Mar. 18, 2020, the content of which is incorporated herein by reference.

BACKGROUND

Field of the Invention

The present invention relates to a management device, a management method, and a program.

Description of Related Art

Japanese Patent Application Laid-open No. 2018-058656 discloses an invention relating to an unmanned delivery system configured to deliver a package by using an autonomous mobile machine that can move autonomously and a server system that operates in association with the autonomous mobile machine.

SUMMARY

The above-mentioned related art loads a package into the autonomous mobile machine in a warehouse, and this configuration is not convenient sufficiently for a user.

The present invention has been made in view of the above-mentioned circumstances, and has an object to provide a management device, a management method, and a program, which are capable of improving the convenience.

The management device, the management method, and the program according to this invention adopt the following configuration.

(1): A management device according to an aspect of the present invention is a management device for managing an operation of a package delivery vehicle configured to travel autonomously on a road without accommodating a driver, and capable of storing a package into each of a plurality of storages each covered by an openable and closable door, the management device including: a storage device that stores a program; and a hardware processor, in which the hardware processor is configured to execute the program stored in the storage device to: receive application information on delivery of the package from a user; and determine an operation of the package delivery vehicle, in which the hardware processor is configured to cause the package delivery vehicle during delivery of a package to collect a new package.

(2): In the aspect (1), the hardware processor is configured to instruct a driving part of the door to load the new package, which is to be collected, into a storage that has become vacant due to delivery by the package delivery vehicle during delivery of a package.

(3): In the aspect (1), the hardware processor is configured to determine a schedule of the package delivery vehicle including a delivery plan and/or a collection plan of the package, and the hardware processor is configured to determine an operation of the package delivery vehicle based on the schedule.

(4): In the aspect (3), the hardware processor is configured to instruct, when the hardware processor has determined a schedule in which the delivery plan of the package and the collection plan of the package are mixed, a terminal device of a collection center to set the same number of storages as the collection plans to be vacant and cause the package delivery vehicle to start.

(5): In the aspect (3), the hardware processor is configured to assign collection plans of a package to the plurality of package delivery vehicles in accordance with a priority, and the hardware processor is configured to determine whether a storage has become vacant in order of the priority, and cause a package delivery vehicle for which the storage has become vacant to collect the package.

(6): In the aspect (5), the schedule determiner is configured to refer to use history information of the user, and set a priority of a package delivery vehicle having a higher probability of absence of a user of a delivery destination to be lower than a priority of a package delivery vehicle having a lower probability of absence of a user of a delivery destination.

(7): In of the aspect (3), the hardware processor is configured to change, when a storage that is planned to load a package by the schedule has not become vacant due to absence of a user of a delivery destination of a stored package, the schedule such that an initially determined path is changed to cause the package delivery vehicle to move for delivery, and the package delivery vehicle to move to a loading location specified by the plan when any one of the plurality of storages has become vacant.

(8): In the aspect (3), the hardware processor is configured to, when a package delivery vehicle is planned to load a new package into a storage that has become vacant after delivery of a package by the schedule, avoid adding a schedule for collection after the package delivery vehicle has started.

(9): In the aspect (1), the hardware processor is configured to provide a terminal device of a user with path information on a movement path of the package delivery vehicle.

(10): A management method according to another aspect of the present invention is a management method to be executed by a management device for managing an operation of a package delivery vehicle configured to travel autonomously on a road without accommodating a driver, and capable of storing a package into each of a plurality of storages each covered by an openable and closable door, the management method including: receiving application information on delivery of the package from a user; determining an operation of the package delivery vehicle; and causing the package delivery vehicle during delivery of a package to collect a new package.

(11): A program according to another aspect of the present invention is a program for causing a computer of a management device for managing an operation of a package delivery vehicle configured to travel autonomously on a road without accommodating a driver, and capable of storing a package into each of a plurality of storages each covered by an openable and closable door, to: receive application information on delivery of the package from a user; determine an operation of the package delivery vehicle; and cause the package delivery vehicle during delivery of a package to collect a new package.

According to the aspects (1) to (11), it is possible to improve convenience.

BRIEF DESCRIPTION OF THE DRAWINGS

FIG. 8 is a diagram illustrating an example of details of movement schedule information.

DESCRIPTION OF EMBODIMENTS

Now, description is given of a management device, a management method, and a program according to an embodiment of the present invention with reference to the drawings. A package delivery vehicle to be managed by the management device can move autonomously on a road without accommodating a driver, and includes a storage of a package covered by an openable and closable door.

The package delivery vehicle recognizes the situation of the outside of the vehicle by a monitoring unit such as a camera, a radar device, and a LIDAR (Light Detection and Ranging) device, and travels along a path indicated by the management device in principle while at the same time avoiding an obstacle on the road. The wheels of the package delivery vehicle are driven by a motor, for example, and the package delivery vehicle moves on the road at a speed of about 10 [km]. In the storage of the package delivery vehicle, for example, a plurality of spaces for loading packages are formed so as to be separated from one another, and a plurality of users can load (carry) respective packages into those spaces.

The management device is configured to manage (control) operation of the package delivery vehicle. The management device may be a device that is placed at a location different from that of the package delivery vehicle, and communicates with the package delivery vehicle via a network or has a part or all of the functions included in the package delivery vehicle. The management device generates delivery schedule information based on application information acquired from a terminal device of a user through communication, for example. Then, the management device uses the delivery schedule information to notify the package delivery vehicle of, for example, a path, a stop location, and an open/close state of the door of the storage of the package delivery vehicle.

In the following description, it is assumed that the management device is a device (device in a mode referred to as cloud server, for example) placed at a location different from that of the package delivery vehicle, and implements the above-mentioned functions by communicating with the terminal device of the user or the package delivery vehicle via a network.

First Embodiment

[Overall Configuration]

Figure 1:
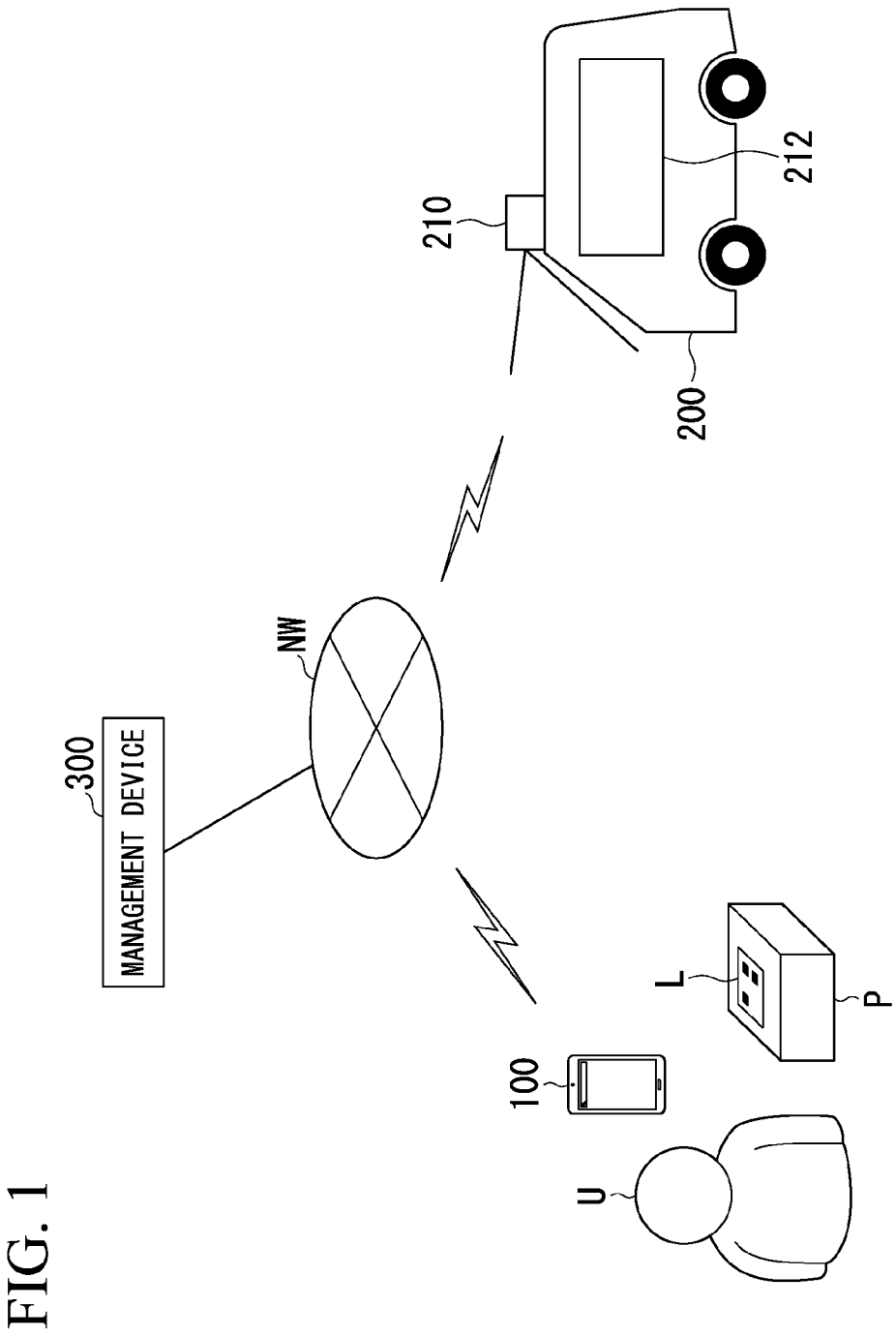
FIG. 1 is a configuration diagram of a delivery system including a management device.

FIG. 1 is a configuration diagram of a delivery system 1 including a management device 300. The delivery system 1 includes one or more package delivery vehicles 200 and the management device 300. The management device 300 communicates with the terminal device 100 used by a user U via a network NW. The network NW includes, for example, the Internet, a wide area network (WAN), a local area network (LAN), a public line, a provider device, a dedicated line, or a wireless base station. Further, the management device 300 communicates with the package delivery vehicle 200 via the network NW. The "terminal device used by a user" refers to a terminal device that may be used by a large number of unspecified people, such as a terminal device of an Internet cafe, and may include a terminal device temporarily used by the user. In any case, the "terminal device of the user" refers to a terminal device for which a user performing operation is identified by a login operation of inputting a login name, for example.

The user U uses the terminal device 100 to transmit application information that requests delivery of a package P to the management device 300. Identification information of the package P and/or the user U is described on the package P, or a label L stored in, for example, an incorporated IC tag is assigned to the package P. The wording "assigned" means placing a sticker, for example.

The terminal device 100 is, for example, a smartphone, a tablet terminal, or a personal computer. An application program for using the above-mentioned service or a browser operates on the terminal device 100, and supports a service described below. In the following description, it is assumed that the terminal device 100 is a smartphone, and an application program (delivery service app) for receiving a service is operating. The delivery service app communicates with the management device 300 in response to an operation of the user, and transmits application information from the user to the management device 300 or provides information based on the information received from the management device 300. The application information refers to electronic information that requests delivery of the package P by the package delivery vehicle 200 along a specified section.

[Package Delivery Vehicle]

The package delivery vehicle 200 includes a monitoring unit 210 such as a camera, a radar device, and a LIDAR device, and travels autonomously on the road as described above. A display device 212 may be provided in the package delivery vehicle 200. The display device 212 may have a touch panel function, or may have an embedded function communicating with a non-contact IC card.

Figure 2:
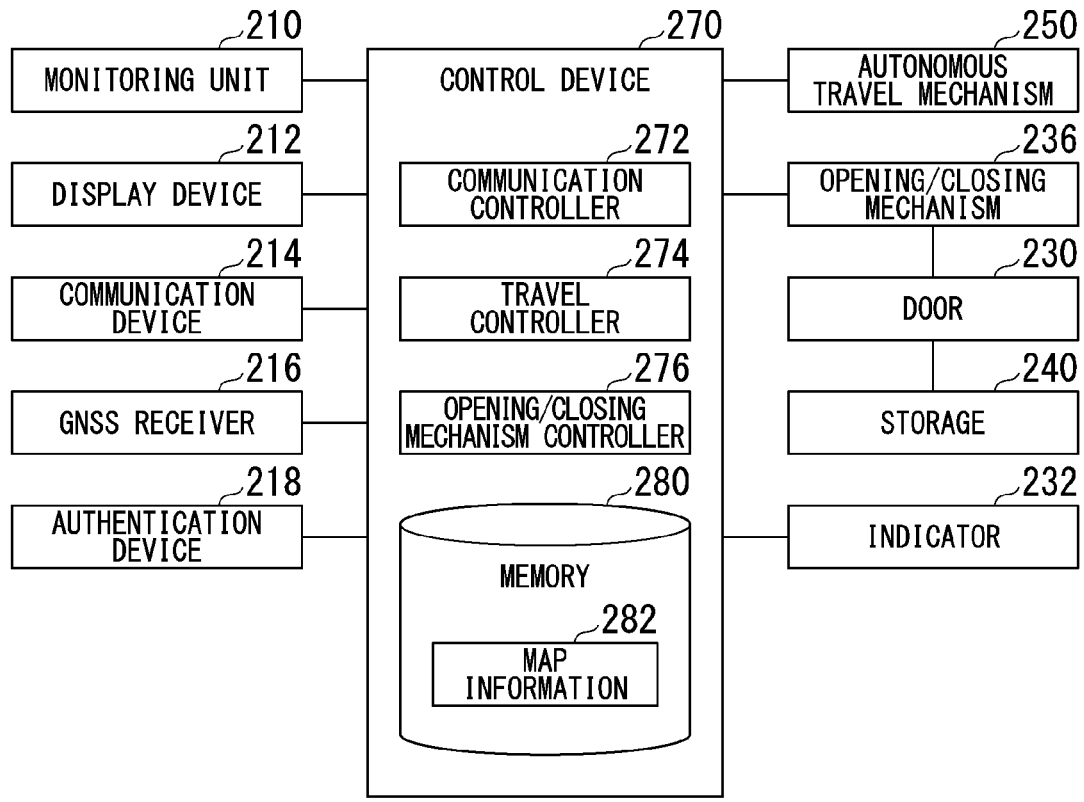
FIG. 2 is a configuration diagram of a package delivery vehicle.

FIG. 2 is a configuration diagram of the package delivery vehicle 200. The package delivery vehicle 200 includes a communication device 214, a GNSS receiver 216, an authentication device 218, an opening/closing mechanism 236, an autonomous travel mechanism 250, and a control device 270 in addition to the monitoring unit 210 and the display device 212 described above.

The communication device 214 is, for example, a wireless communication module for connecting to the network NW, or directly communicating with, for example, another vehicle or a terminal device of a pedestrian. The communication device 214 performs wireless communication based on Wi-Fi, DSRC (Dedicated Short Range Communications), Bluetooth (registered trademark), or other communication standards. A plurality of communication devices may be prepared as the communication device 214 depending on the purpose.

The GNSS receiver 216 measures its position (position of package delivery vehicle 200) based on a radio wave received from a GNSS satellite (e.g., GPS satellite). The GNSS receiver 216 outputs the result of measurement to the control device 270.

The authentication device 218 is a device for checking whether a user who is trying to load the package P into the package delivery vehicle 200 is a valid user (authenticating user). The valid user herein refers to a user who has made arrangement (reservation) of delivery of a package with the management device 300. The authentication device 218 may be any device as long as the device has an authentication function such as a near-field communication device, a biometric authentication device, or a password input device. The authentication device 218 outputs a result of authentication to the control device 270.

The opening/closing mechanism 236 is provided for each door of doors 230, and includes, for example, a motor and an arm. The opening/closing mechanism 236 individually opens/closes one of the doors 230. A switch that detects that the doors 230 are manually closed is mounted to the doors 230, for example. Instead of (or in addition to) the opening/closing mechanism 236, a locking mechanism may be provided. In that case, after the door 230 of the storage 240 to be used by the user U is unlocked and an indicator 23 (described later) is turned on, the user U manually opens and closes one of the door 230.

Figure 3:
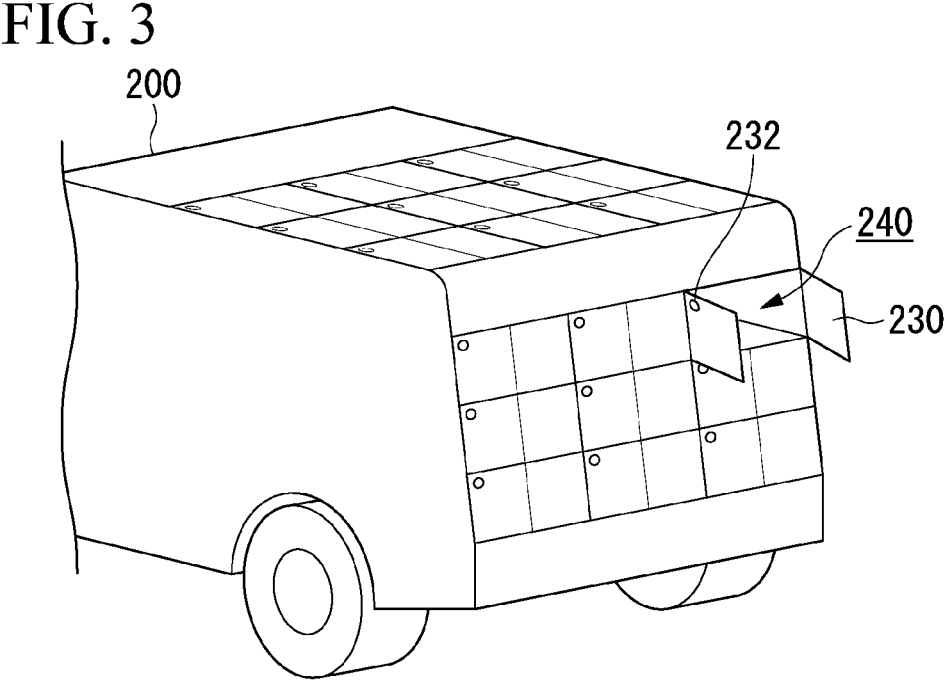
FIG. 3 is a diagram illustrating an example of structure of the plurality of storages.

FIG. 3 is a diagram illustrating an example of structure of the plurality of storages 240. The package delivery vehicle 200 includes the plurality of storages 240. In the illustrated configuration, nine storages 240 that open toward the upper surface of the package delivery vehicle 200 and nine storages 240 that open toward the rear surface are provided in the package delivery vehicle 200. The door 230 is provided for each of the storage 240. The doors 230 are, for example, hinged double doors, and at least a part of the storage 240 is exposed under a state in which the door 230 is opened. An indicator 232 is mounted in association with each storage 240 (e.g., on the surface side of each door 230). The indicator 232 includes, for example, a light emitting diode (LED). The indicator 232 is caused to emit light by a loading/unloading controller 276 so as to indicate a loading position of the package P to be loaded or a position at which the package P to be unloaded is stored. Each storage 240 is set to store one package P or store the package P of one user U. The owner of the package P stored in the storage 240 is recognized based on which storage 240 stores the package P in a collection center, for example. Then, for example, a worker of the collection center assigns a label to the package P, to thereby be able to identify a delivery destination (unloading location) in subsequent work.

The autonomous travel mechanism 250 includes, for example, a wheel, a drive power source such as a motor, energy storage means such as a battery, and a steering mechanism. The autonomous travel mechanism 250 causes the package delivery vehicle 200 to move in any direction in accordance with an instruction from the control device 270.

The control device 270 includes, for example, a communication controller 272, a travel controller 274, and an opening/closing mechanism controller 276. These components are implemented by a hardware processor such as a central processing unit (CPU) executing a program (software), for example. A part or all of these components may be implemented by hardware (circuit or circuitry) such as large scale integration (LSI), application specific integrated circuit (ASIC), field-programmable gate array (FPGA), or graphics processing unit (GPU), or may be implemented through cooperation between software and hardware. The program may be stored in a storage device (storage device including non-transitory storage medium) such as a hard disk drive (HDD) or a flash memory in advance, or may be stored in a removable storage medium (non-transitory storage medium) such as a DVD or a CD-ROM, and may be installed into the storage device by the storage medium being mounted to a drive device. The control device 270 includes a storage 280 storing map information 282. The storage 280 is, for example, an HDD, a flash memory, a ROM, or a random access memory (RAM).

The communication controller 272 acquires path information from the management device 300 via the communication device 214, and outputs the path information to the travel controller 274. The communication controller 272 uses the communication device 214 to upload position information indicating the position measured by the GNSS receiver 216 to the management device 300. The position information is uploaded periodically in units of millisecond to second, for example.

The travel controller 274 controls the autonomous travel mechanism 250 such that the package delivery vehicle 200 travels along a path specified by the management device 300. The travel controller 274 matches the path acquired from the management device 300 with the map information 282 and output of the monitoring unit 210, and determines a detailed path through which the package delivery vehicle 200 is to travel, for example. The travel controller 274 causes the package delivery vehicle 200 to travel autonomously so that the package delivery vehicle 200 travels on the path in principle while at the same time avoiding collision with an object (including guardrail or curb) for which the position and speed are input from the monitoring unit 210.

When the travel controller 274 has acquired a stop instruction from the management device 300, the travel controller 274 stops the package delivery vehicle 200. Instead, when the path information includes information of a stop position, the travel controller 274 may cause the package delivery vehicle 200 to stop when the result of measurement by the GNSS receiver 216 and the stop position match each other. In other words, the management device 300 gives a stop instruction or information of the stop position to the travel controller 274, and the travel controller 274 stops the package delivery vehicle 200 in accordance with the instruction or information. The position at which the package delivery vehicle 200 is caused to stop includes a road. In particular, when the user U loads the package P into the storage 240 of the package delivery vehicle 200, the package delivery vehicle 200 stops on the road or in a parking lot, for example.

The opening/closing mechanism controller 276 drives the indicator 232 or the opening/closing mechanism 236 at a timing indicated by the management device 300, for example.

[Management Device]

Figures 4, 5:
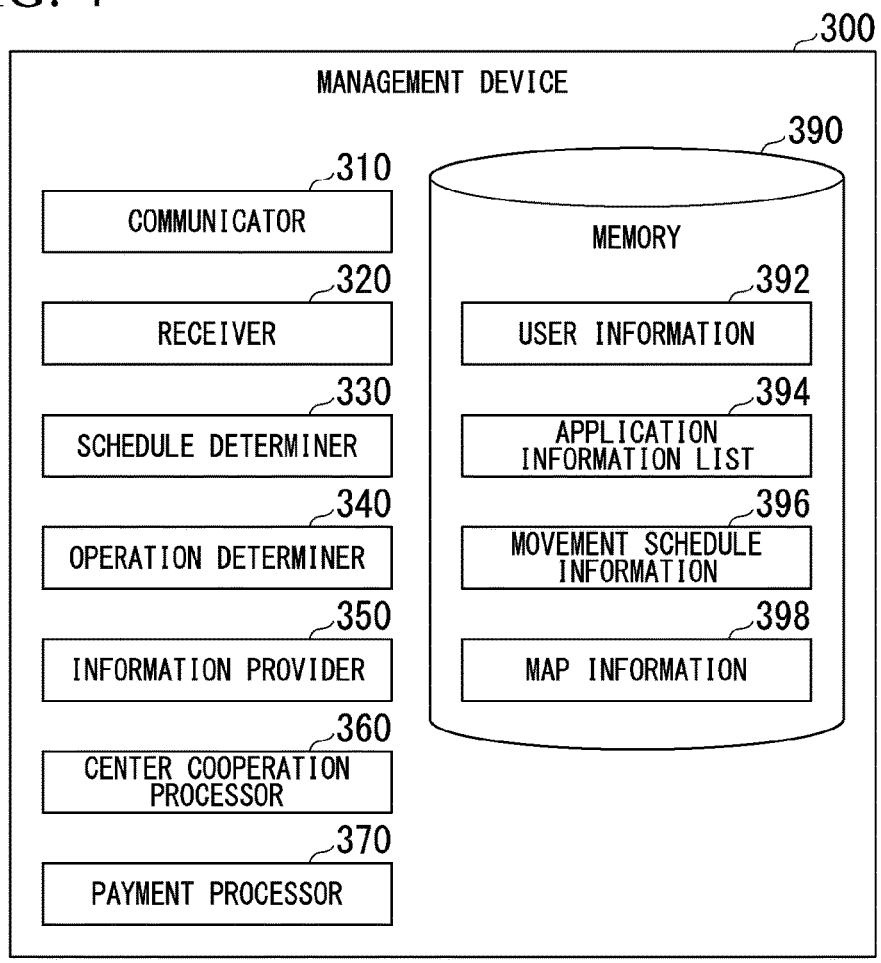
FIG. 4 is a configuration diagram of the management device.
FIG. 5 is a diagram illustrating an example of details of user information.

FIG. 4 is a configuration diagram of the management device 300. The management device 300 includes, for example, a communicator 310, a receiver 320, a schedule determiner 330, an operation determiner 340, an information provider 350, a center cooperation processor 360, and a payment processor 370. These components are implemented by a hardware processor such as a central processing unit (CPU) executing a program (software), for example. A part or all of these components may be implemented by hardware (circuit or circuitry) such as LSI, ASIC, FPGA, or GPU, or may be implemented through cooperation between software and hardware. The program may be stored in a storage device (storage device including non-transitory storage medium) such as a HDD or a flash memory in advance, or may be stored in a removable storage medium (non-transitory storage medium) such as a DVD or a CD-ROM, and may be installed into the storage device by the storage medium being mounted to a drive device. The management device 300 may include a storage 390. The storage 390 is implemented by, for example, a DVD, a random access memory (RAM), or a flash memory. The storage 390 stores information such as user information 392, an application information list 394, movement schedule information 396, and map information 398.

FIG. 5 is a diagram illustrating an example of details of the user information 392. The user information 392 associates, for example, a user ID being identification information of a user with information such as communication identification information, name, sex, age, address, and occupation. Each item of the user information 392 is registered in advance at the time of application for a service that is managed by the management device 300, for example. The communication identification information is information necessary for transmitting information to the terminal device 100, and is information such as an app ID assigned to the application program, an IP (Internet Protocol) address, a MAC (Media Access Control) address, and an e-mail address.

The communicator 310 is a network card for connecting to the network NW, for example. The communicator 310 communicates with the terminal device 100 or the vehicle 200 via the network NW.

Figures 6, 7:
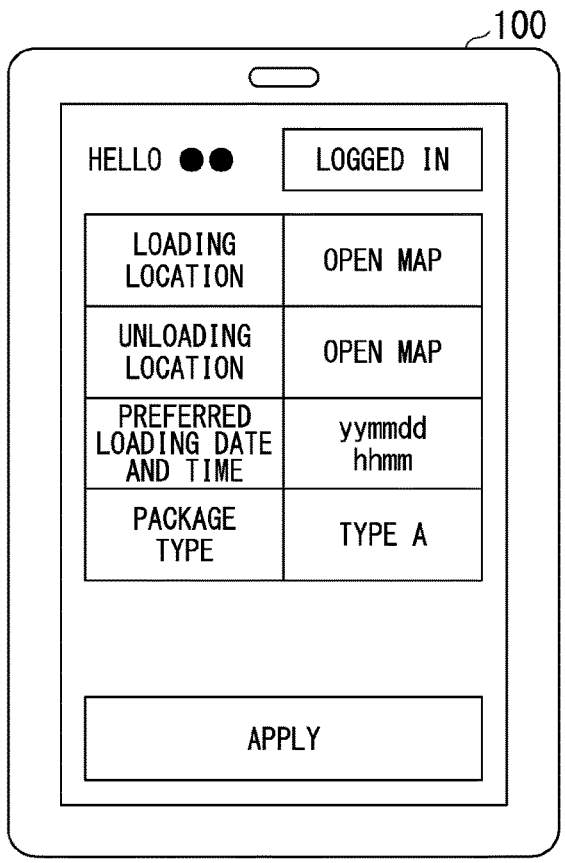
FIG. 6 is a diagram illustrating an example of a delivery service application screen for inputting application information, which is displayed on a display of a terminal device.
FIG. 7 is a diagram illustrating an example of details of an application information list.

The receiver 320 acquires (receives) application information issued from the terminal device 100 of the user via the communicator 310, and adds the application information to the application information list 394. FIG. 6 is a diagram illustrating an example of a delivery service application screen for inputting application information to be displayed on a display of the terminal device 100. As illustrated in FIG. 6, a loading location (first specification information), an unloading location (second specification information), a preferred loading time, and a package type indicating the size or shape of a package can be input on the delivery service application screen, and information input by the user U is transmitted to the management device 300 as the application information. The loading location or unloading location is input by, for example, the terminal device 100 displaying a map and the user U specifying a location on the map.

FIG. 7 is a diagram illustrating an example of details of the application information list 394. The application information list 394 is information that associates, for example, a user ID of a user who has given the application information, a package ID being identification information for identifying a package, a loading location serving as a start point of a section relating to delivery of a package, an unloading location serving as an end point of the section, a preferred loading time, a package type, and storage specification information with one another. One set of the user ID, the loading location, the unloading location, the preferred loading time, the package type, the label information, and the storage space relating to one piece of application information are hereinafter referred to as "record". The package ID is assigned by the receiver 320. The application information is information in any format, including details necessary for generating one record. The storage specification information is information indicating which storage 240 is assigned. In FIG. 7, "1" of "1-3" indicates one of the storages 240 that opens toward the upper side of the package delivery vehicle 200, and "-3" of "1-3" indicates one of the nine storages on the upper side. Furthermore, "2" of "2-2" indicates one of the storages 240 that opens toward the back side of the package delivery vehicle 200, and "-2" of "2-2" indicates one of the nine storages on the back side.

The storage specification information is determined by the schedule determiner 330, for example. When the schedule determiner 330 determines storage specification information in association with the application information received from the user U, the schedule determiner 330 transmits the determined details to the terminal device 100 of the user. The terminal device 100 displays information indicating the determined details. In this manner, the user U can recognize the position of the storage 240 that is to store the package P in advance.

When a record of new application information is added to the application information list 394, the schedule determiner 330 refers to a list (not shown) of the package delivery vehicles 200 and the movement schedule information 396, and selects the package delivery vehicle 200 to be used by the user U relating to the application information from among the plurality of package delivery vehicles 200. For example, the schedule determiner 330 refers to the package type included in the application information to narrow down to the package delivery vehicle 200 capable of delivering the package P, and then when it is appropriate to incorporate collection of the package P into an existing movement schedule of the package delivery vehicle 200 already incorporated in the movement schedule information 396, the schedule determiner 330 adds collection of the package P to the existing movement schedule, or otherwise, the schedule determiner 330 sets a new movement schedule of the package delivery vehicle 200 and registers collection of the package P. Then, the schedule determiner 330 determines the storage specification information as described above, and transmits the storage specification information to the terminal device 100 of the user U.

FIG. 8 is a diagram illustrating an example of details of the movement schedule information 396. The movement schedule information 396 is set for each package delivery vehicle 200 in units of schedule of one day. The movement schedule information 396 associates, for each storage 240, a predicted time, information indicating loading or unloading, the package ID of the package P to be delivered, a location of loading or unloading, and information (e.g., path from previous event to current event) for identifying a path between locations with an event (hereinafter referred to as "loading event" or "unloading event") of loading or unloading. The path is represented by arranging links in the map information 398 in order, for example. For example, the schedule determiner 330 roughly groups records of the application information by date, time slot, and region, sets several movement patterns in which a plurality of loading locations and preferred loading times are arranged in order, extracts a movement pattern having the lowest movement cost by referring to the map information 398, and adds the extracted movement pattern to the movement schedule information 396. Various techniques of calculating and evaluating a movement cost are publicly known in the field of a navigation system, and thus description thereof is omitted here.

The operation determiner 340 uses the communicator 310 to transmit an operation instruction to the package delivery vehicle 200 based on the movement schedule information 396 as described above. In other words, the operation determiner 340 determines the operation of the package delivery vehicle 200 based on the movement schedule information 396 generated based on the application information received by the receiver 320. The operation of the package delivery vehicle 200 to be determined by the operation determiner 340 includes details such as a path, a stop instruction (stop timing may be specified, or location may be specified in advance and the package delivery vehicle 200 may determine stop timing) for a loading location or unloading location, and which storage 240 is set to be vacant at the loading location or unloading location.

As illustrated in FIG. 8, regarding the storage 240 specified by "1-1" of the storage specification information, the movement schedule information 396 is set such that the package P with the package ID of "A012" is loaded at an event (1), the package P is unloaded at an event (2) after delivery, and after that the package P with the package ID of "A658" is loaded at an event (5). Furthermore, regarding the storage 240 specified by "2-1" of the storage specification information, the package P with the package ID of "A333" is loaded at an event (3) during delivery of the package P by another storage 240. The operation determiner 340 following this storage specification information causes the package delivery vehicle 200 during delivery of the package to collect a new package P. Furthermore, the operation determiner 340 gives an instruction to the opening/closing mechanism 236 being a driver of the door 230 such that the storage 240, which has become vacant due to delivery by the package delivery vehicle 200 during delivery of the package P, loads a new package P to be collected. As a result, it is possible to improve convenience.

The information provider 350 provides the terminal device 100 of the user U with position information and path information of the package delivery vehicle 200. The information provider 350 uses the communicator 310 to transmit, to the terminal device 100, position information uploaded by the communication controller 272 of the package delivery vehicle 200 through use of the communication device 214 or path information described in the movement schedule information 396. The information provider 350 transmits, to the terminal device 100, information for overlapping an image indicating position information or path information with the map information and displaying the image, for example.

Figure 9:
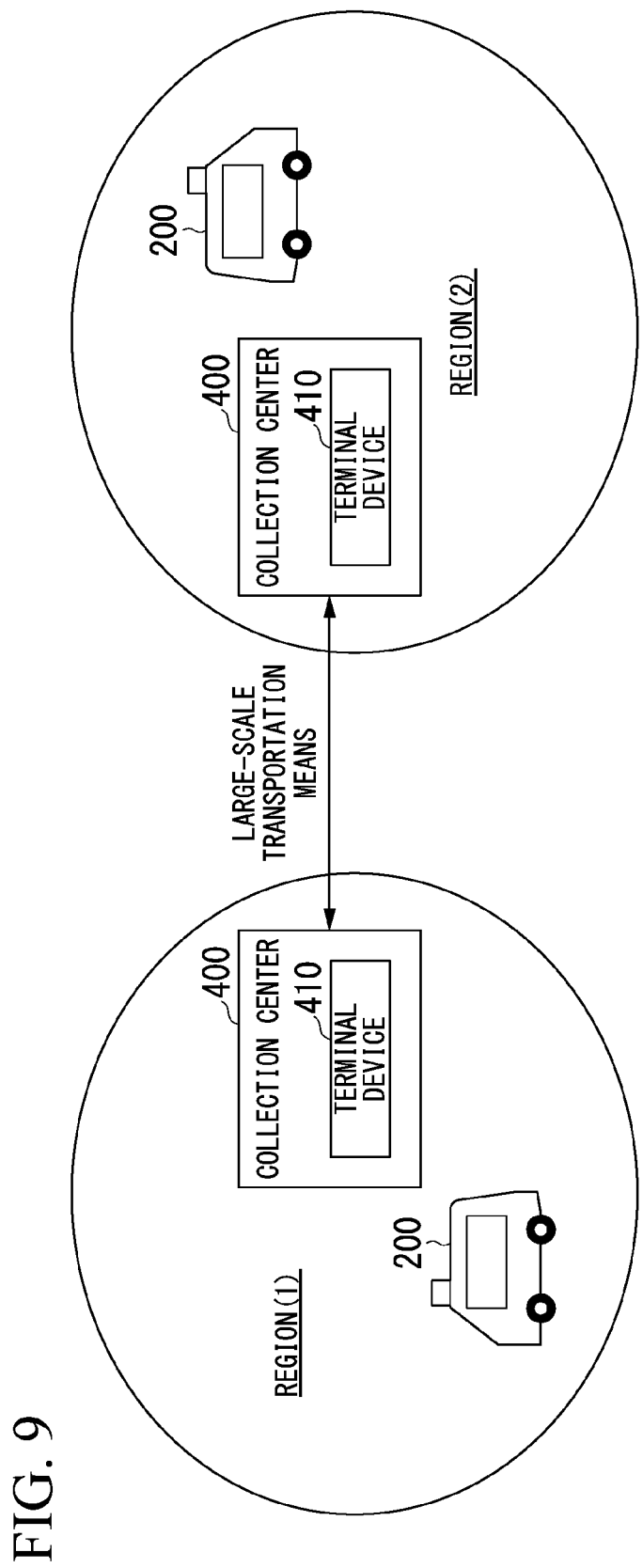
FIG. 9 is a diagram illustrating a role of a collection center.

The center cooperation processor 360 executes processing for cooperating with a collection center 400. FIG. 9 is a diagram illustrating a role of the collection center 400. The collection center 400 is provided for each arbitrarily partitioned region. The package delivery vehicle 200 may finish delivery without passing through the collection center 400 in the case of collection to delivery within a region, but when delivery to outside of a region is specified, the package delivery vehicle 200 delivers the package P to the collection center 400 collection center 400 and then unloads the package P. Large-scale transportation means such as a large truck or a railroad delivers the package P between the collection center 400 and the collection center 400. Then, the package P is loaded into the package delivery vehicle 200 at the collection center 400 serving as a delivery destination, and is delivered to the delivery destination. The loading location and unloading location of the movement schedule information 396 may be the collection center 400. In particular, the packages P with the package IDs of A012, A264, and A654 at the event (1) of FIG. 8 are delivered at the collection center 400. A terminal device 410 for receiving an instruction from the management device 300 and presenting the instruction to the terminal device 410 is installed in the collection center 400. The center cooperation processor 360 identifies the package delivery vehicle 200 for the terminal device 410, and transmits information for specifying the package P to be loaded into the package delivery vehicle 200. As a result, the package P is loaded at the collection center 400.

The payment processor 370 executes processing for collecting a charge from the user U. For example, the payment processor 380 collects a charge from the user U in cooperation with a management server of a credit card or electronic money.

[Other Control]

Processing may not be executed as scheduled by the movement schedule information 396 at a site where the package delivery vehicle 200 travels actually. For example, there may not be the user U who is a recipient at an unloading location to which the package P is to be delivered. At this time, when another package is loaded into the storage 240, which is assumed to become vacant due to delivery, the storage 240 stores the package P in actuality, and thus another package may not be loaded.

In order to address such a situation, when the storage 240, which is planned to load the package P in the movement schedule information 396, has not become vacant because there is no user U at the delivery destination of the stored package P, the movement schedule information 396 is changed such that the initially determined path is changed to cause the package delivery vehicle 200 to move to deliver the package P and the package delivery vehicle 200 moves to a loading location specified by a loading plan at a time when any one of the storages 240 has become vacant.

Figure 10:
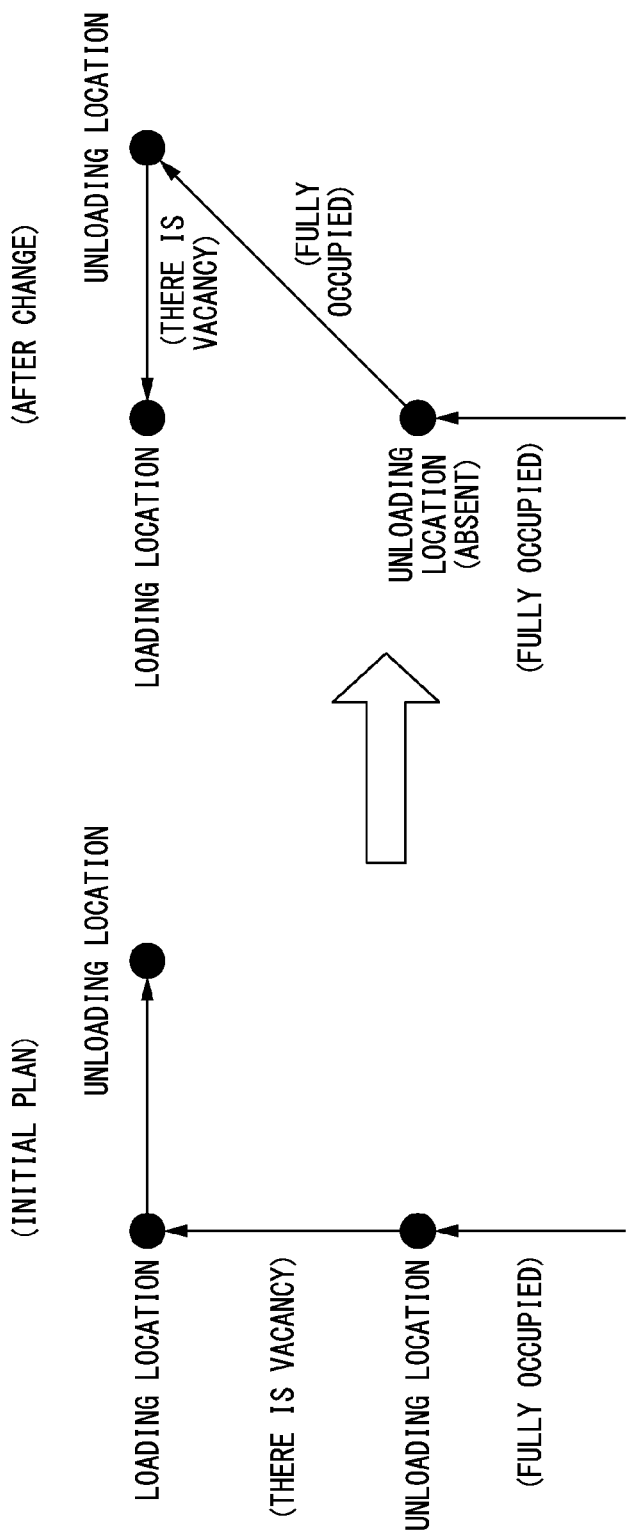
FIG. 10 is a diagram schematically illustrating movement schedule information changed by a schedule determiner in a case where the storage is fully occupied.

In order to implement such an operation, the package delivery vehicle 200 transmits the operation status of the door 230 at the loading location or unloading location to the management device 300. The schedule determiner 330 determines that the package P has not been delivered as planned based on information received from the package delivery vehicle 200, and changes the movement schedule information 396 such that the package delivery vehicle 200 is caused to move to the location of a next unloading event when the next event is a loading event and there is no vacant storage 240, and when the package P has been delivered as planned after movement, the package delivery vehicle 200 is caused to move to a loading location of a previous loading event to load the package P. FIG. 10 is a diagram schematically illustrating the movement schedule information 396 changed by the schedule determiner 330 when the storage 240 is fully occupied. In this scene, the schedule determiner 330 may transmit, to the terminal device 100 of the user U who plans to load the package P, information indicating that the delivery time is delayed due to change of the schedule, to notify the user U of that delay.

The schedule determiner 330 may or may not add, to the movement schedule information 396, an event for the package delivery vehicle 200 that has started. In a case where an event for the package delivery vehicle 200 that has started is added, when the movement schedule information 396 for the package delivery vehicle 200 indicates that a new package is to be loaded into the storage 240 that becomes vacant after delivery of the package P, the schedule determiner 330 may not add a schedule for collection after the package delivery vehicle 200 has started. In this manner, it is possible to reduce the possibility of occurrence of a phenomenon in which the package P cannot be loaded because there is no user U who is a recipient.

Furthermore, when movement schedule information in which a collection plan and a delivery plan for the package P are mixed is determined for a certain package delivery vehicle 200, the center cooperation processor 360 may instruct the terminal device 410 of the collection center 400 to set the number of storages 240 as that of the collection plans to be vacant and cause the package delivery vehicle 200 to start. Specifically, the schedule determiner 330 determines the movement schedule information 396 in which the same number of storages 240 as that of the collection plans are set to be vacant as described above, and the center cooperation processor 360 transmits, to the terminal device 410, information that transfers a loading event at the collection center 400 in the collection center 400.

According to the first embodiment described above, it is possible to improve convenience.

Second Embodiment

Now, description is given of a second embodiment. In the first embodiment, a loading event and an unloading event are assigned to one package delivery vehicle 200. The second embodiment is different from the first embodiment in that one loading event is assigned to a plurality of package delivery vehicles 200. Now, description is given with focus on this difference.

Figure 11:
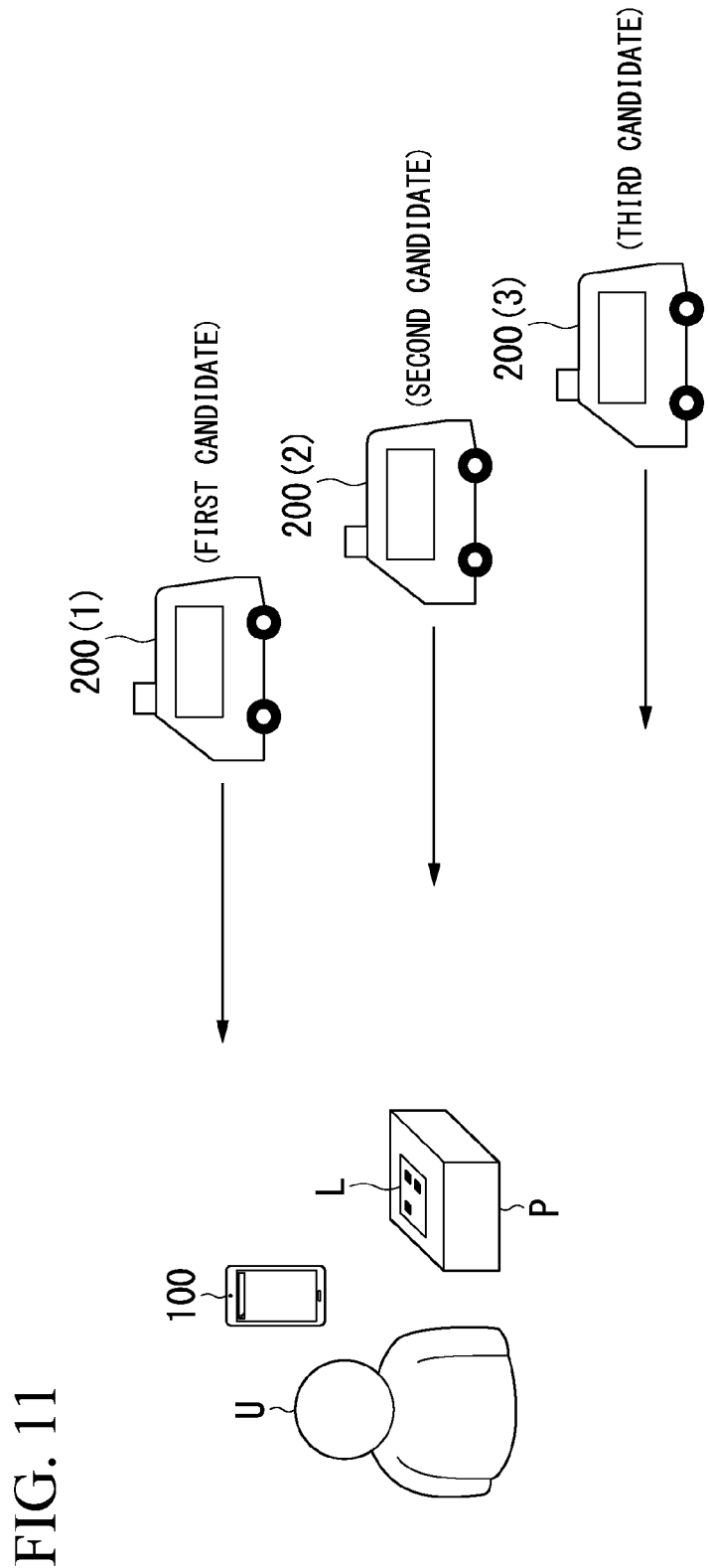
FIG. 11 is a diagram for describing processing to be executed by the schedule determiner in a second embodiment.

FIG. 11 is a diagram for describing the processing to be executed by the schedule determiner 330 in the second embodiment. In the second embodiment, for example, the schedule determiner 330 sets a package delivery vehicle 200(1) as a first candidate, a package delivery vehicle 200(2) as a second candidate, and a package delivery vehicle 200(3) as a third candidate, and sets a loading event of the package P of the illustrated user U in the movement schedule information 396 for each package delivery vehicle 200. Such a scene occurs in a case where the vacant storage 240 for loading by the user U cannot be prepared at the time of start, or in a case where the vacant storage 240 can be prepared but a loading event of another user U is set first, resulting in a possibility that there is no vacant storage 240 at a time when the position of the user U is reached. When such a condition is satisfied, the schedule determiner 330 prepares the plurality of package delivery vehicles 200 for collection of one package P.

The schedule determiner 330 determines a priority (priority of candidate) in accordance with the following rule.
(A) The degree of closeness between reachable time and preferred loading time.
(B) Whether past absence probability of recipient of package P planned to be delivered first by the package delivery vehicle 200 is low.

The schedule determiner 330 determines the movement schedule information 396 such that the package delivery vehicle 200 having a higher priority reaches a loading location in order. Then, when it is determined that the target package P is loaded into any one of the package delivery vehicle 200 based on information received from each package delivery vehicle 200, the loading event of the package P is deleted from the movement schedule information 396 of another package delivery vehicle 200, and a path is set again.

Figure 12:
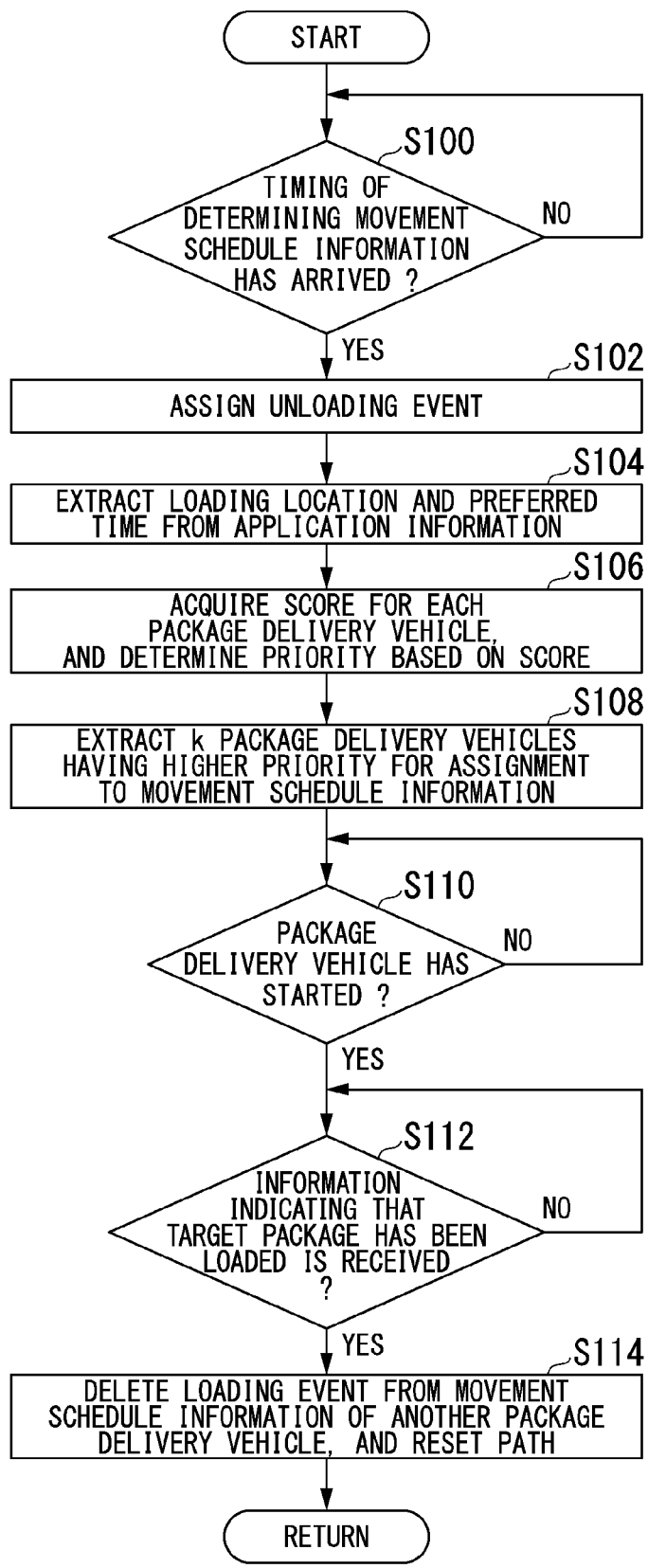
FIG. 12 is a flow chart illustrating an example of a flow of processing to be executed by a management device in the second embodiment.

FIG. 12 is a flow chart illustrating an example of a flow of processing to be executed by a management device 300 in a second embodiment. First, the management device 300 determines whether the timing of determining the movement schedule information 396 has arrived (Step S100). The timing of determining the movement schedule information 396 may periodically arrive, or may arrive every time application information is received in a predetermined time band. In this flow chart, it is assumed that the timing arrives once a day, for example, in order to simplify description.

When the timing of determining the movement schedule information 396 arrives, the schedule determiner 330 first assigns an unloading event to the movement schedule information 396 (Step S102). Next, the schedule determiner 330 extracts a loading location and a preferred desired time (that is, original information of loading event) from the application information (Step S104), the schedule determiner 330 acquires a score for each package delivery vehicle 200 in relation to the loading event, and determines a priority based on the score (Step S106). The schedule determiner 330 derives the score based on the rules (A) and (B) described above. Then, the schedule determiner 330 extracts the k package delivery vehicles 200 (k is an integer equal to or larger than 2) having a higher priority, and assigns a loading event to the movement schedule information 396 thereof (Step S108). The processing of Step S102 to Step S108 is executed repeatedly in an appropriate manner depending on the number of records of the application information.

When the movement schedule information 396 is determined, the management device 300 determines whether the package delivery vehicle 200 has started (Step S110). When the package delivery vehicle 200 has started, the schedule determiner 330 determines whether information indicating that the target package P has been loaded is received from the package delivery vehicle 200 (Step S112). When the information indicating that the target package P has been loaded is received from the package delivery vehicle 200, the schedule determiner 330 deletes the loading event of the package P from the movement schedule information 396 of another package delivery vehicle 200, and resets a path for the package delivery vehicle 200 (Step S114).

According to the second embodiment described above, it is possible to collect a package more reliably while at the same time obtaining an effect similar to that of the first embodiment.

The above-mentioned embodiment can be represented in the following manner.

A management device for managing an operation of a package delivery vehicle configured to travel autonomously on a road without accommodating a driver, and capable of storing a package into each of a plurality of storages each covered by an openable and closable door, the management device including:

a storage device storing a program; and a hardware processor;

in which the hardware processor executes the program to:

receive application information on delivery of the package from a user; and determine an operation of the package delivery vehicle, in which the hardware processor is configured to cause the package delivery vehicle during delivery of a package to collect a new package.

In the above, modes for carrying out the present invention have been described by way of embodiments. However, the present invention is not limited to such embodiments in any manner, and various kinds of modifications and replacements can be made within the scope that does not depart from the gist of the present invention.

What is claimed is:

1. A management device for managing an operation of a package delivery vehicle configured to travel autonomously on a road without accommodating a driver, and capable of storing a package into each of a plurality of storages each covered by an openable and closable door, the openable and closable door of each of the plurality of storages being provided with an indicator configured to emit light so as to indicate a loading position of the package to be loaded or a position at which the package to be unloaded is stored, the management device comprising:
  a storage device that stores a program; and
  a hardware processor,
    wherein the hardware processor is configured to execute the program stored in the storage device to:
    receive application information on delivery of the package from a user; and
    determine an operation of the package delivery vehicle,
    wherein the hardware processor is configured to cause the package delivery vehicle during delivery of a package to collect a new package,
    wherein the hardware processor is configured to determine a schedule of the package delivery vehicle including a delivery plan and/or a collection plan of the package,
    wherein the hardware processor is configured to determine an operation of the package delivery vehicle based on the schedule, and
    wherein the hardware processor is configured to instruct, when the hardware processor has determined a schedule in which the delivery plan of the package and the collection plan of the package are mixed, a terminal device of a collection center to set a same number of storages as determined collection plans to be vacant and cause the package delivery vehicle to start.

2. The management device according to claim 1, wherein the hardware processor is configured to instruct a driving part of the door to load the new package, which is to be collected, into a storage that has become vacant due to delivery by the package delivery vehicle during delivery of a package.

3. The management device according to claim 1,
  wherein the hardware processor is configured to assign collection plans of a package to the plurality of package delivery vehicles in accordance with a priority, and
  wherein the hardware processor is configured to determine whether a storage has become vacant in order of the priority, and cause a package delivery vehicle for which the storage has become vacant to collect the package.

4. The management device according to claim 3, wherein the schedule determiner is configured to refer to use history information of the user, and set a priority of a package delivery vehicle having a higher probability of absence of a user of a delivery destination to be lower than a priority of a package delivery vehicle having a lower probability of absence of a user of a delivery destination.

5. The management device according to claim 1, wherein the hardware processor is configured to change, when a storage that is planned to load a package by the schedule has not become vacant due to absence of a user of a delivery destination of a stored package, the schedule such that an initially determined path is changed to cause the package delivery vehicle to move for delivery, and the package delivery vehicle to move to a loading location specified by the plan when any one of the plurality of storages has become vacant.

6. The management device according to claim 1, wherein the hardware processor is configured to, when a package delivery vehicle is planned to load a new package into a storage that has become vacant after delivery of a package by the schedule, avoid adding a schedule for collection after the package delivery vehicle has started.

7. The management device according to claim 1, wherein the hardware processor is configured to provide a terminal device of a user with path information on a movement path of the package delivery vehicle.

8. A management method to be executed by a management device for managing an operation of a package delivery vehicle configured to travel autonomously on a road without accommodating a driver, and capable of storing a package into each of a plurality of storages each covered by an openable and closable door, the openable and closable door of each of the plurality of storages being provided with an indicator configured to emit light so as to indicate a loading position of the package to be loaded or a position at which the package to be unloaded is stored, the management method comprising:
  receiving application information on delivery of the package from a user;
  determining an operation of the package delivery vehicle; and
  causing the package delivery vehicle during delivery of a package to collect a new package,
  wherein the management method further comprises determining a schedule of the package delivery vehicle including a delivery plan and/or a collection plan of the package,
  wherein the management method further comprises determining an operation of the package delivery vehicle based on the schedule, and
  wherein the management method further comprises instructing, when a schedule in which the delivery plan of the package and the collection plan of the package are mixed has been determined, a terminal device of a collection center to set a same number of storages as determined collection plans to be vacant and cause the package delivery vehicle to start.

9. A program for causing a computer of a management device for managing an operation of a package delivery vehicle configured to travel autonomously on a road without accommodating a driver, and capable of storing a package into each of a plurality of storages each covered by an openable and closable door, the openable and closable door of each of the plurality of storages being provided with an indicator configured to emit light so as to indicate a loading position of the package to be loaded or a position at which the package to be unloaded is stored, to:
  receive application information on delivery of the package from a user;
  determine an operation of the package delivery vehicle; and
  cause the package delivery vehicle during delivery of a package to collect a new package,
  wherein the program further causes the computer to determine a schedule of the package delivery vehicle including a delivery plan and/or a collection plan of the package,
  wherein the program further causes the computer to determine an operation of the package delivery vehicle based on the schedule, and
  wherein the program further causes the computer to instruct, when a schedule in which the delivery plan of the package and the collection plan of the package are mixed has been determined, a terminal device of a collection center to set a same number of storages as determined collection plans to be vacant and cause the package delivery vehicle to start.

10. A package delivery vehicle configured to travel autonomously on a road without accommodating a driver, and capable of storing a package into each of a plurality of storages each covered by an openable and closable door, the openable and closable door of each of the plurality of storages being provided with an indicator configured to emit light so as to indicate a loading position of the package to be loaded or a position at which the package to be unloaded is stored, the package delivery vehicle comprising: a storage device that stores a program; and a hardware processor, wherein the hardware processor is configured to execute the program stored in the storage device to: receive application information on delivery of the package from a user; and determine an operation of the package delivery vehicle, wherein the hardware processor is configured to cause the package delivery vehicle during delivery of a package to collect a new package, wherein the hardware processor is configured to determine a schedule of the package delivery vehicle including a delivery plan and/or a collection plan of the package, wherein the hardware processor is configured to determine an operation of the package delivery vehicle based on the schedule, wherein the hardware processor is configured to instruct, when the hardware processor has determined a schedule in which the delivery plan of the package and the collection plan of the package are mixed, a terminal device of a collection center to set a same number of storages as determined collection plans to be vacant and cause the package delivery vehicle to start.

* * * * *